Feb. 28, 1967 L. M. HALLS ET AL 3,306,014
COMBINATION HEADER AND CROP CONDITIONING UNIT THEREFOR
Filed July 21, 1964 4 Sheets-Sheet 1

INVENTORS
LAWRENCE M. HALLS &
HORACE G. MC CARTY
BY
ATTORNEY

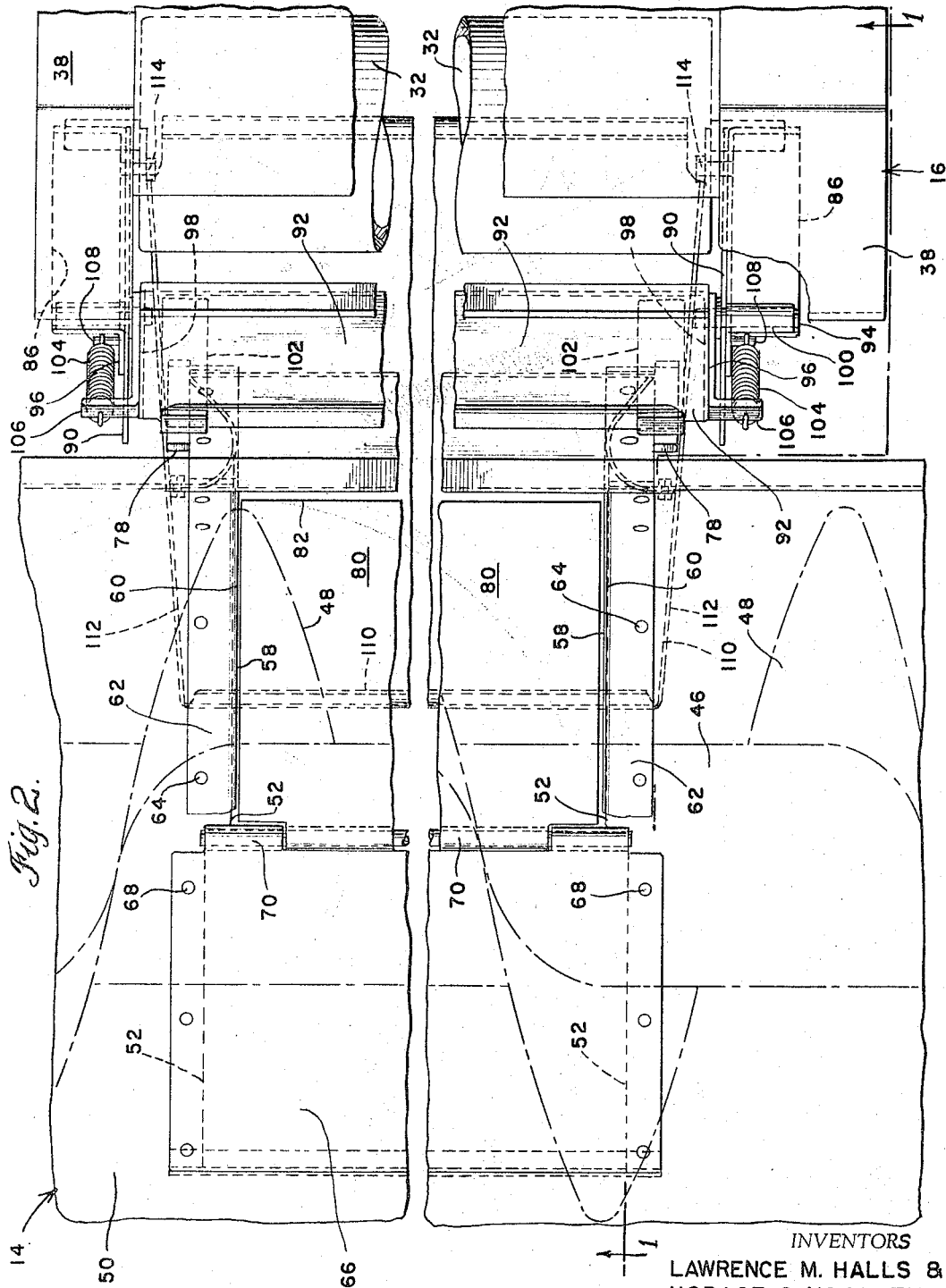

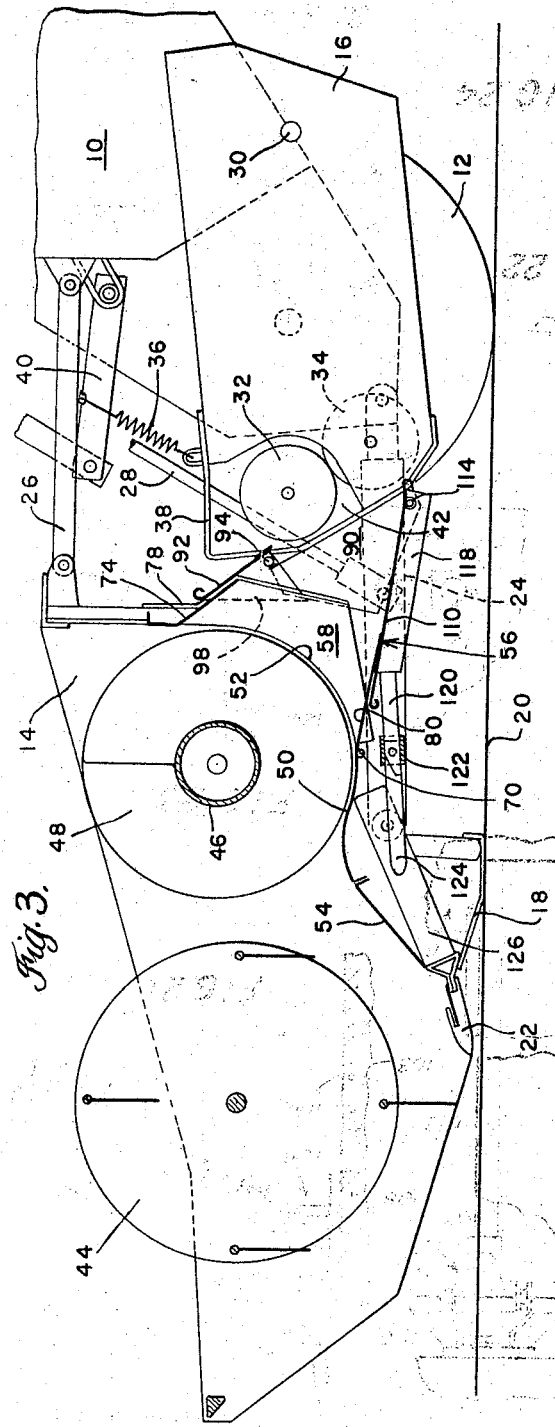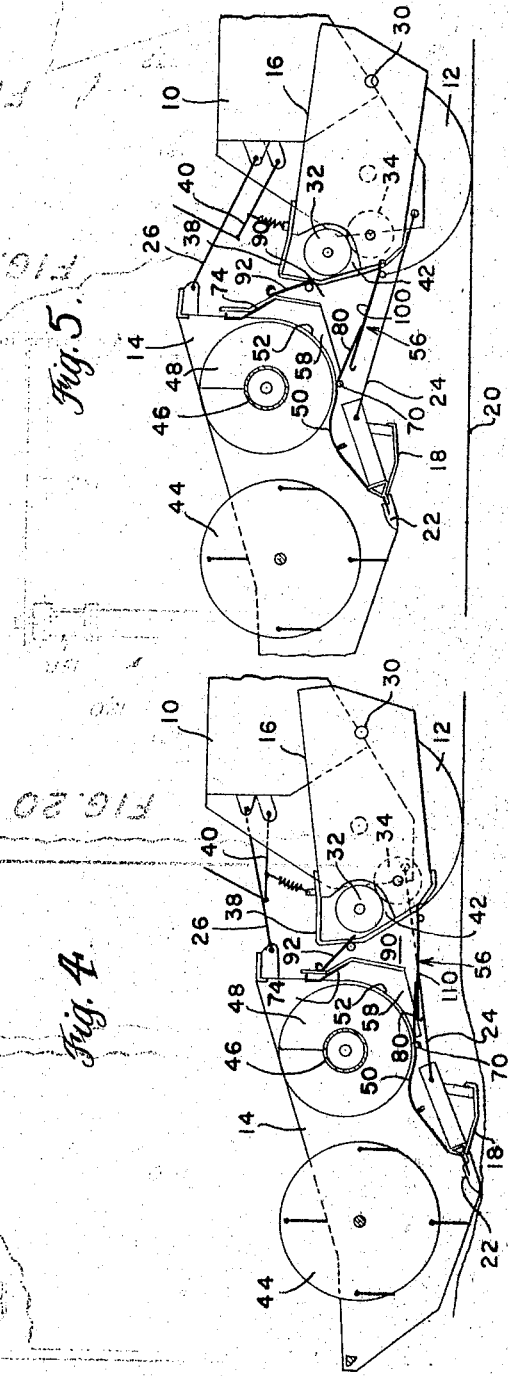

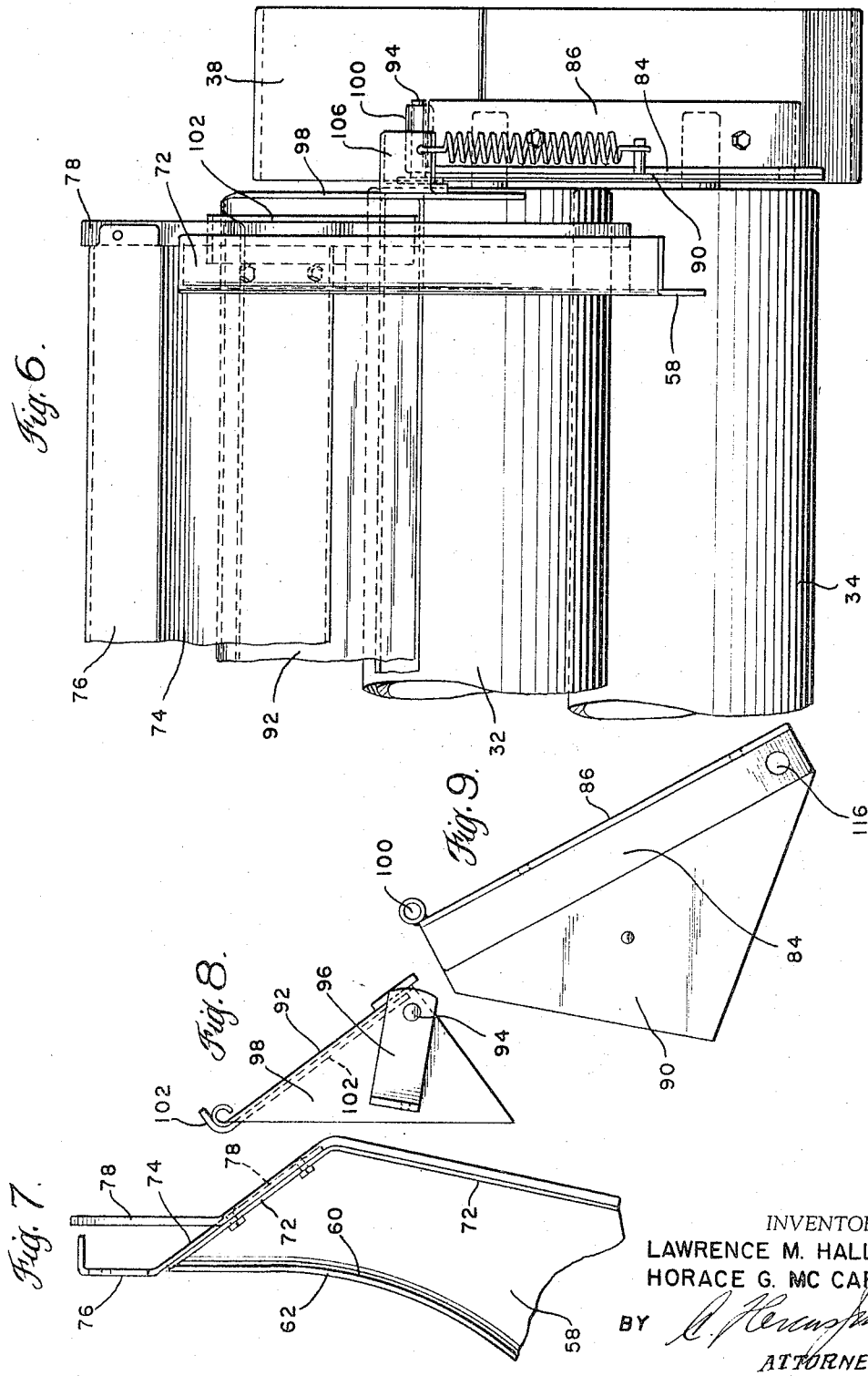

United States Patent Office 3,306,014
Patented Feb. 28, 1967

3,306,014
COMBINATION HEADER AND CROP
CONDITIONING UNIT THEREFOR
Lawrence M. Halls and Horace G. McCarty, New Holland, Pa., assignors to Sperry Rand Corporation, New Holland, Pa., a corporation of Delaware
Filed July 21, 1964, Ser. No. 384,075
15 Claims. (Cl. 56—23)

This invention pertains to agricultural equipment known as a header comprising a sickle bar unit arranged to cut a relatively wide swath of crop material, move the same progressively to a consolidating auger and the consolidated material is discharged through an exit opening of the header to crop-conditioning means which primarily is intended to crush the consolidated material, especially heavy stems thereof, such as are present in alfalfa, and the like, to facilitate the drying thereof, and then discharge the consolidated and conditioned crop material as a windrow onto the ground. More particularly, the present invention pertains to chute means connectable to and extending between the discharge opening of the header and the entrance of the crop-conditioning unit.

In accordance with the principles of the present invention, the header is supported by appropriate linkage means extending forwardly from the front end of a tractor, preferably to support the header for vertical, floating movement with respect to the contour of a field being harvested. The crop conditioner unit likewise is supported by the forward end of such tractor, but by separate connecting means only partially associated with the linkage means for the header, whereby said header and conditioner unit are movable to a limited extent independently of each other in view of such independent suspension of said header and conditioner unit from the forward end of the tractor.

In view of such independent suspension of the header and conditioner unit by the forward end of the tractor, whereby the header, in following the contour of a field, normally moves substantially greater distances vertically with respect to the tractor than the conditioner unit, a problem is present with respect to transferring consolidated material from the exit of the header, for example, to the entrance of the crop-conditioner unit, where different vertical movements are sustained by the header and conditioner unit, almost constanly, as the same are functioning in their intended capacities.

It is a principal object of the present invention to solve the problem of transferring consolidated material from the discharge opening of the header immediately adjacent the central portion of the auger, rearwardly to the entrance of a crop-conditioner unit through chute-like transfer means which preferably enclose the material completely at the bottom, top, and opposite sides, incident to being transferred from said header to the conditioner unit under the conditions described above with respect to relative vertical movements of said header and conditioner unit.

It is a further object of the invention to provide chute means which comprises first and second sections telescopically related to each other and respectively connected to the header adjacent the discharge opening thereof and the conditioner unit adjacent the entrance thereof, said sections having overlapping portions which cooperate with each other in a flexible manner, whereby said chute means can be considered to be of a yieldable nature and thereby adapt itself readily to different directions and amounts of vertical movement simultaneously occurring to the header and conditioner unit during harvester operations.

A still further object of the invention is to provide relatively simple, but rugged and durable, supporting or connecting means for the several sections of the chute means which, essentially, are channel-like, the top of the channel also being covered by plate-like means capable of yielding to the above-described differentials in vertical movement between the header and conditioner unit.

Still other objects of the invention are to provide various details of construction and mechanisms to insure the desired, flexible operation of the several sections of the chute means with respect to each other and thereby enhance the overall operation of the header and conditioner unit, as well as the chute means for transferring consolidated material from one to the other.

Details of the foregoing objects and of the invention, as well as other objects thereof, are set forth in the following specification and illustrated in the accompanying drawings comprising a part thereof.

In the drawings:

FIG. 1 is a fragmentary partially vertical sectional elevation of the portion of a header adjacent the discharge opening thereof and the entrance end of a fragmentarily illustrated crop-conditioner unit, as seen on line 1—1 of FIG. 2, said figure primarily showing an exterior side elevation of the chute means extending between said header and unit for transferring consolidated material from one to the other.

FIG. 2 is a fragmentary plan view having an interruption in the mid portion thereof to permit concise illustration of certain details of opposite sides of the header and conditioner unit mechanism shown in FIG. 1, together with opposite sides of the chute means also shown in FIG. 1.

FIG. 3 is a side elevation showing somewhat diagrammatically a header and conditioner unit supported by the forward end of a fragmentarily illustrated tractor and showing the chute means extending between said header and condition unit when the header is moving along substantially level ground.

FIG. 4 is a view similar to FIG. 3, but on a smaller scale and illustrating the relative positions of the components shown in FIG. 3 when the header is traversing a gulley in the contour, which has not yet been engaged by the tractor.

FIG. 5 is a view similar to FIG. 4 with the forward portion of the header removed to consolidate the view and showing the header and conditioner unit in the relative positions thereof when elevated a substantial distance above the ground relative to the tractor.

FIG. 6 is a fragentary front elevation of the left-hand side (facing forwardly) of the chute means and entrance of the coditioner unit, s seen on line 6—6 of FIG. 1, as would be seen from the front of the tractor with the header removed, said view being on a scale similar to that of FIG. 2.

Figure 1:
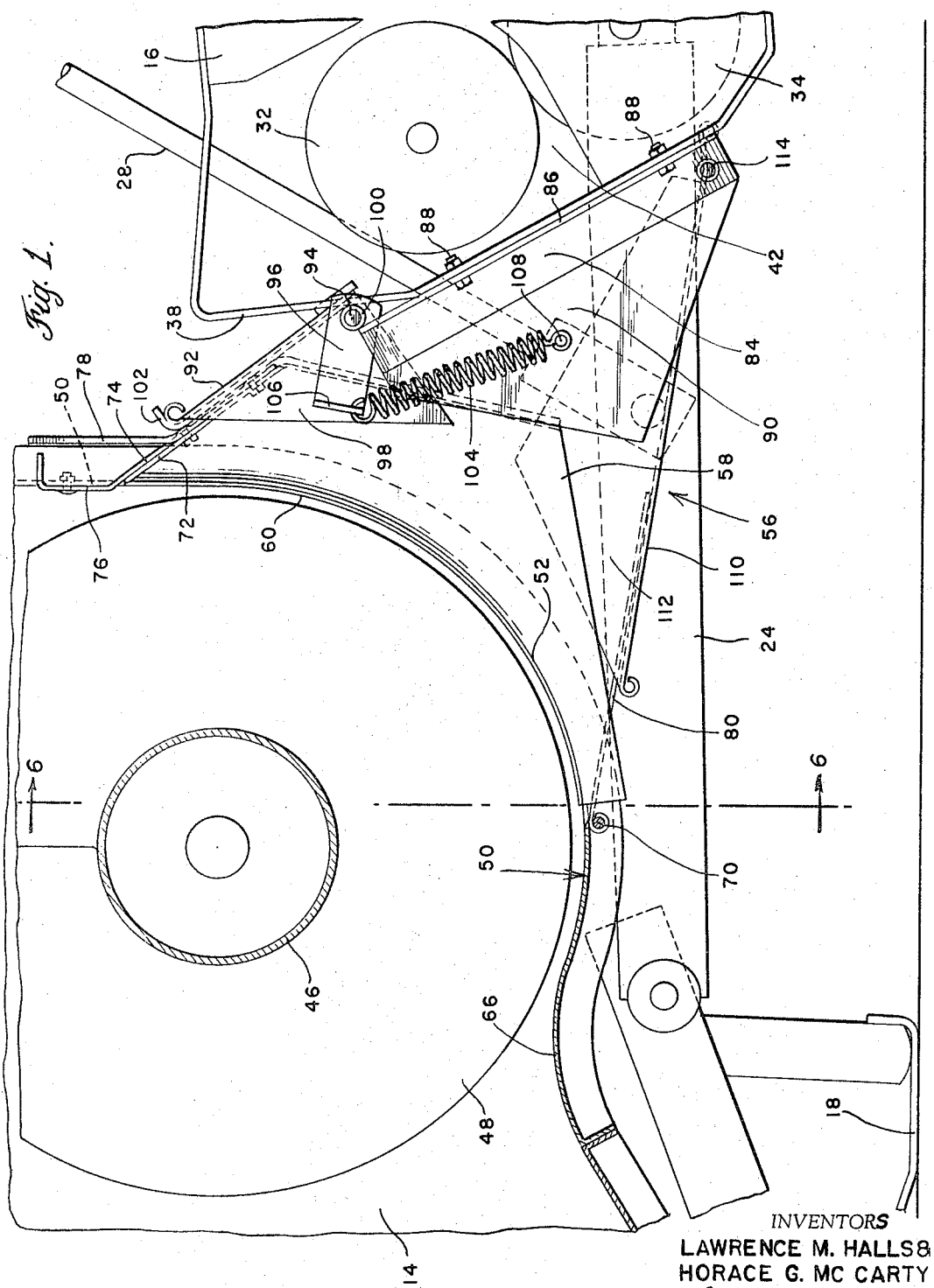

FIGS. 7, 8 and 9 respectively represent side elevations, somewhat in associated exploded manner, of certain components of the chute means, the portion shown in FIG. 7 being only fragmentarily illustrated.

Referring particularly to FIG. 3, the forward portion of a tractor 10 is fragmentarily illustrated, said tractor being supported by a pair of wheels 12 disposed at opposite sides of the frame of the tractor adjacent the forward end thereof. Primarily by means of said wheels, the tractor support at said forward end thereof, independently of each other, a header 14 and a conditioner unit 16. Particularly for purposes of permitting the header 14, which is provided with ground-engaging shoes 18 to follow the contour of the ground surface 20 in order that the sickle bar assembly 22 may cut crop material relatively close to the ground, or at an elevated position, if desired, the header 14 is supported for floating, vertical movement with respect to the tractor 10. Such supporting means primarily includes pairs of heavy lower links 24 and upper links 26, the links of each pair respectively being adjacent opposite sides of the front end of the tractor 10. The rearward ends of said links are pivotally connected to appropriate brackets at the front end of the tractor 10 and the forward ends of the links are pivotally connected to the frame mechanism of the header 14, substantially in accordance with customary practice in apparatus of this type.

Though not illustrated in detail, the header 14 may be elevated to different positions above the ground 20, as desired, one such exemplary position being illustrated in FIG. 5. This is a position, for example, in which the apparatus is moved to a field for harvesting. The elevation of the header 14 is accomplished by appropriate power mechanism, not shown, but contained in the tractor 10 and including linkage means 28, which, preferably, is connected at the lower ends thereof to the lower links 24, as more or less shown in diagrammatic and exemplary manner in FIG. 3. Elevation of this type likewise is of a type normally employed for that purpose in similar mechanisms.

Also, though likewise not illustrated in detail, suitable powerful springs are interconnected between the supporting links of the header 14, such as lower links 24, and appropriate bracket means on the tractor 10, whereby the vertical movement of the header 14 with respect to the tractor may take place in a floating manner and thus not cause the header mechanism to be subjected to sudden shock. Further, in view of such support, it is necessary to rely entirely upon operation of the elevating linkage means 28 to effect desired support and movement of the header with respect to the tractor.

As indicated above, the conditioner unit 16 also is supported by the tractor 10 independently of the header 14, preferably through pivot means 30 adjacent the rearward end of the unit 16. Hence, the forward end of the unit 16, which contains a pair of transversely extending crushing rollers 32 and 34, supported by mechanism not illustrated in detail, permitting limited separative movement, under pressure, from each other, is movably vertically to a limited extend through the use of spring suspension means 36 shown in exemplary manner in FIGS. 3-5. Such spring suspension means 36 extend between portions of guard members 38, which are disposed at opposite sides of the unit 16, and elevating linkage means 40 supported by the tractor 10 and operated by suitably power means of the tractor, not shown. Thus, the spring means 36 afford a certain amount of floating movement of the forward end of the conditioner unit 16 and the crusher rollers 32 and 34 thereof, which are adjacent the entrance 42 of the unit 16.

For purposes of illustrating, at least diagrammatically, the primary elements of the header 14, it will be seen from FIGS. 3-5 that the forward portion of the header 14 supports a rotatable reel 44 and an auger 46 which, as best seen in FIG. 2, has spiral flights 48 which spiral in opposite directions from the opposite ends of the auger toward the center thereof. The drive means for the auger, not shown in detatil, is such that the auger is rotated in a direction to consolidate from opposite ends of the arcuate support 50 while passing beneath the axis thereof, toward the exit opening 52 which is substantially narrower than the entire width of the auger 48 and header 14. Suitable guide means 54 extend upward and rearwardly from the sickle bar assembly 22 toward the arcuate support 50 for purposes of delivering material, as cut, and as impelled by the reel 44, to the auger 46 for consolidation thereof toward the center followed by discharge of the consolidated material through the exit opening 52 for delivery to the entrance 42 of the crop-conditioner unit 16.

In view of the floating movement permitted the header 14 in a vertical direction, as described above, and particularly in view of the fact that such vertical floating movement normally is of a substantially greater extent than any similar normal vertical floating movement of the forward end of the conditioner unit 16, transferring the consolidated material from the exit 52 of the header 14 to the entrance 42 of the conditioner unit 16 is accomplished by chute means of a type designed to permit such differential in vertical floating movement of the header and conditioner unit while maintaining substantially complete enclosure of the consolidated material being transferred as described. Details of such chute means, and the functions thereof, are as follows.

The chute means 56 which extends between the discharge opening 52 of header 14 and the entrance 42 between the crushing rollers 32 and 35 of the conditioner unit 16 is composed of two sections or parts respectively connected to the header and conditioner unit, the elements of which are as follows.

The first section or part of the chute means is connected to the header 14 adjacent the exit opening 52 and comprises top, bottom and side means preferably in the nature of rigid, sheet-like plates. The side plates 58 each have an arcuate edge 60 complementary to the sides of the discharge opening 52 in the arcuate support 50, said arcuate edge 60 of each plate respectively having flanges 62 projecting laterally in opposite directions therefrom for connection to the inner surface of the arcuate support means 50 by means of rivets 64, or the like, as shown in FIG. 2. In the preferred construction of the discharge opening 52, which is formed in the arcuate support 50, there is a forward extension thereof normally closed by an arcuate plate 66 when the conditioner unit 16 is employed in conjunction with the header 14. The plate 66 is secured detachably across said forward extension of the exit opening 52 by any suitable means, such as bolts 68, and the rearward edge of the plate 66 has elongated hinge means 70 thereon, for purposes to be described.

The side elevation of at least the upper portion of the side plates 58 of the first section of the chute means are best illustrated in FIG. 7, wherein it will be seen that the rearward and upper edges of said side plates have outwardly extending, lateral flanges 72. Extending between and connected to the upper portions of the flanges 72 is a top plate 74, having a vertical extremity 76 which overlies part of the upper portion of support 50, as best seen in FIG. 1. Also connected to the upper portion of each of the flanges 72 is a wear strip, for purposes to be described, the upper portion of said wear strips 78 terminating in vertical direction, as best shown in FIG. 7.

From the foregoing, it will be seen that the side plates 58 and top plate 74 of the first section of the chute means 56 are rigidly carried by the header 14. However, the bottom of the first section of said chute means comprises a plate 80, which is of sufficient width to extend between the side plates 58, with limited clearance, as best shown in FIGS. 1 and 2, the forward edge of bottom plate 80 being connected by hinge means 70 to the rearward edge of the arcuate cover plate 66, which bridges the forward portion of exit opening 52 of the header when the conditioner unit 16 is being utilized. The trailing edge 82 rests by gravity upon bottom plate means of the second chute section, details of which will now be described.

The second chute section is connected to the forward end of the conditioner unit 16 and, as specifically shown in the present drawings, utilizes the guard members 38 at opposite sides of the conditioner unit as adequate support means. Said guard members preferably comprise sheet steel strips of the order of about 3" in width and ¼" thick. Essentially, they cover driving gears, bearings and the like not illustrated, for the crushing rollers 32 and 34 to prevent crop material from becoming enmeshed therein. Said second section of the chute means basically comprises connecting members 84, which, preferably, are angle iron members having transversely related flanges, the flange 86 of each being respectively connected by bolts 88 to the guard members 38 as clearly shown in FIG. 1.

The connecting members 84 comprise the direct supporting means for the side plates 90 and also part of the supporting means for the top plate 92 and the bottom plate 94 of said second section. The side plates 90 are essentially triangular in shape, as best shown in FIGS. 1 and 9, and they are rigidly supported with respect to the conditioner unit 16. The top plate 92, however, is pivotally supported at its lower edge by the upper ends of connecting members 84 so that the top plate 92 normally extends upwardly and forwardly therefrom. Such pivotal supporting means for plate 92 comprises a pair of pintles 94, carried by suitable brackets 96 fixed to triangular side plates connected to and extending transversely from the opposite side edges of the top plate 92. Said pintles 94 are received within bearings 100 in the upper ends of the connecting members 84.

Extending along the inner surfaces of the top plate 92 are wear strips 102, which are disposed adjacent the side plates 98 and are slidably engageable with the wear strips 78 connected to side plates 58 of the first portion of the chute means which are fixed to the header 14. The transverse positions of the wear strips 102 on top plate 92 are positioned so that such co-engagement with wear strips 78 may be accomplished, such alignment being best illustrated in FIGS. 2 and 6.

The side plates 98 of top plate 92 of the second chute section are disposed parallel to and adjacent the inner surfaces of side plates 90, so as to at least partially overlie the same in operation as best shown in FIGS. 1 and 3. Also, said side plates 98 are parallel to, but disposed outwardly from, the outer surfaces of side plates 58 on said first section of the chute means carried by the header 14, as clearly shown particularly in FIG. 3.

Normally, the upper, or terminal edge of the cover plate 92, and especially the wear strips 102 thereon, are maintained in slidable engagement with the top plate 74 of the first section of the chute means and especially the wear plates 78 thereon. Such slidable engagement is maintained positively, but yieldably tensioned by springs 104 disposed at opposite sides of the entrance to the conditioner unit 16. Said springs extend between outwardly extending ears 106 of brackets 96 and pins 108 carried by and projecting outwardly from the side plates 90 of the second chute section. The brackets 96 serve as levers with respect to the pivots 94 to permit such desired tensioning by the springs 104 to occur automatically and constantly, regardless of the relative positions of the two sections of the chute means 56 with respect to each other during operation of the header and conditioner unit as carried by the tractor 10 under substantially all conditions of operation and various contour surfaces of a field.

The last element of the second section of the chute means, which is carried by the conditioner unit 16 for purposes of forming a complete enclosure for the crop material by said second section of the chute means as the material passes to the entrance 42 of the conditioner unit, comprises a bottom plate 110. Such plate 110 is slightly wider than bottom plate 80 of the first chute section and is provided with side plates 112, which preferably are rigidly connected to the opposite side edges of bottom plate 110 and extend perpendicularly therefrom so as to lie adjacent and between the lower portions of the side plates 58 of the first chute section and side plates 90 of the second chute section, as clearly shown in FIG. 1.

Projecting in opposite directions from the opposite side edges of the bottom plate 110, adjacent the rearward edge thereof, are axially aligned pintles 114, which are received within bearing opening 16 formed in the flanges of the connecting members 84 to which the side plates 90 are connected, said bearing openings best being shown in FIG. 9. Supporting means for the bottom plate 110 comprise supporting members 118, see FIG. 3, which underlie the bottom plate 110 and have a forwardly projecting tongue slidably disposed within a guide block 122 carried by the rearward portion of arms 125 connected to a lower portion 126 of the frame of the header 14. By such an arrangement, as the header moves vertically in floating manner with respect to the forward end of tractor 10, and notwithstanding the fact that there may or may not be corresponding vertical movement of the forward end of conditioner unit 16, the slidably connection between tongue 120 and guide block 122 will permit the bottom plate 110 to move vertically, a limited distance, at its forward end with respect to its pivot bearing 114 adjacent its rearward edge. During any such movement of bottom plate 110, the rearward edge of bottom plate 80 of the first chute section slidably engages the upper surface of bottom plate 110 and thereby provides a firm support therefor, as well as a flexible connection between the bottom plates of the first and second sections of the chute means 56.

From the foregoing, it will be seen that the present invention provides a relatively simple, yet highly effective, chute means extending between the exit or discharge opening of a header supported for independent, floating vertical movement with respect to the forward end of a tractor and the entrance of a crop-conditioning unit which also is supported by the forward end of a tractor, but semi-independently of the header, whereby variable vertical movement of the exit opening and entrance usually occurs, but, notwithstanding the same, the interrelated and co-engaging first and second sections of chute means which completely enclose the passage provided with the condensed crop material passing from the auger of the header to the crushing rolls of the conditioner unit readily permits such variations in movement of discharge opening and entrance means without disrupting the chute means. The relative positions of the various components of the first and second sections of the chute means are well illustrated, in detail, in FIG. 1, and also are illustrated substantially diagrammatically in FIGS. 3–5. Hence, under substantially all conditions of varying relative positions between the header and crop conditioner unit with respect to the tractor which commonly but independently supports the same, the chute means 56 functions to provide an uninterrupted chutelike passageway, covered also at the top thereof, whereby efficient transfer to consolidated material from the auger of the header to the crushing and treating rollers of the conditioner unit occurs.

While the invention has been described and illustrated in its several preferred embodiments, it should be understood that the invention is not to be limited to the precise details herein illustrated and described since the same may be carried out in other ways falling within the scope of the invention as claimed.

We claim:

1. A header having a frame arranged to be connected to the forward end of a tractor for support and propulsion thereby and comprising a sickle bar assembly adjacent the forward lower portion of said header, an arcuate support extending transversely between the sides of said frame, an auger rotatable across said support and having oppositely spiralled flights to engage cut crop material received from said sickle bar assembly and consolidate the same toward the center of said support, an exit opening substantially narrower than said auger formed centrally of said support to discharge said consolidated material continuously from said auger, and means supporting said header for vertical movement relative to the tractor to permit the same to adapt to contour irregularities of a field being harvested, in combination with a crop-conditioner unit mounted between said header and the forward end of said tractor and having an entrance in register with said exit means of said header and including a plurality of conditioning rollers rotatably supported for cooperation with each other, said conditioner unit also having an exit rearward of said rollers, support means for said crop-conditioner unit arranged to be connected to the forward end of said tractor and connected to said crop-conditioner unit for support thereof by said forward end of said tractor generally independently of said header and arranged to permit limited vertical floating movement of said conditioner unit, and chute means extending between said exit opening of said auger and the entrance of said crop-conditioner unit, said chute means including top, bottom and side means enclosing the transfer of said consolidated material from said header to said conditioner unit and said means having portions respectively carried by said header and conditioner unit and movably interengaging each other to permit relative vertical movement between said header and conditioner unit without disrupting the enclosing function of said chute means relative to such transfer of said material.

2. The header and conditioner unit combination according to claim 1 in which said members forming said chute means are formed from substantially rigid sheet-like plate means.

3. The header and conditioner unit combination according to claim 2 in which certain edges of certain of the plate means forming said top and bottom members of said chute means slidably engage certain other of said plate means in overlapping relationship.

4. The header and conditioner unit combination according to claim 2 in which the sheet-like plate means forming the bottom means of said chute means comprise slidably coengaging plates respectively connected to and supported pivotally by said header and conditioner unit for limited vertical movement relative thereto.

5. The header and conditioner unit combination according to claim 3 in which two of said plate means are flexibly connected along a transverse horizontal axis and additionally including spring means inter-connected between said plate means adjacent the side edges thereof and operable to maintain the outer edge of one of said plate means slidably engageable with additional plate means on said header.

6. The header and conditioner unit combination according to claim 5 further including wear strips fixed to the plate means which slidably engage each other.

7. A header having a frame arranged to be connected to the forward end of a tractor for support and propulsion thereby and comprising a sickle bar assembly adjacent the forward lower portion of said header, an arcuate support extending transversely between the sides of said frame, an auger rotatable across said support and having oppositely spiralled flights to engage cut crop material received from said sickle bar assembly and consolidate the same toward the center of said support, an exit opening substantially narrower than said auger formed centrally of said support to discharge said consolidated material continuously from said auger, and means supporting said header for limited vertical movement relative to the forward end of said tractor to permit the same to adapt to contour irregularities of a field being harvested, in combination with a crop-conditioner unit having an entrance of a width similar to that of said exit means of said header and in longitudinal register therewith and including a plurality of conditioning rollers rotatably supported for cooperation with each other, and support means for said crop-conditioner unit and arranged to be connected to the forward end of said tractor and operable to support said crop-conditioner unit by said forward end of said tractor generally independently of said header and arranged to permit limited vertical floating movement relative to the forward end of said tractor, channel-like chute means extending between said exit opening of said auger and the entrance of said crop-conditioner unit comprising pairs of bottom and side plates carried respectively by said conditioner unit and header and slidably overlapping each other to maintain continuous sides and bottom for said chute means between the exhit of said header and entrance of said conditioner unit during limited vertical movement of said header and unit relative to each other, and top means for said chute means comprising a first plate connected to the header adjacent the upper edge of said exit opening and extending downwardly and rearwardly therefrom, and a second plate supported at one edge of said conditioner unit and extending upwardly and forwardly therefrom for slidable engagement relative to said first plate, whereby said first and second plates in conjunction with said channel-like chute enclose the material being transferred from said header to said conditioner unit and thereby insure positive delivery of all of such material to said conditioner unit.

8. The header and conditioner unit combination according to claim 7 including spring means operable relative to one of said plates of said top means to urge one edge thereof constantly toward the other plate for slidable engagement therewith.

9. The header and conditioner unit combination according to claim 8 in which said second plate is hingedly connected at said one edge to the conditioner unit and overlies said first plate, and said spring means is interconnected to the opposite side edges of said second plate to urge the outer edge of the same downwardly toward said first plate.

10. The header and conditioner unit combination according to claim 9 including wear strips fixed to said first and second plates and overlying the adjacent surfaces of the opposite edges of said plates, said wear strips slidably engaging each other.

11. The header and conditioner unit combination according to claim 7 further including side plate members extending perpendicularly from the edges of the opposite ends of said second plate, and additional side plate members extending from said header and conditioner unit adjacent and parallel to said side plate members of said second plate, said side plate members respectively being adjacent the opposite side edges of the exit opening of said auger and entrance of said crop-conditioner unit and overlapping each other to form substantially completely enclosed sides for said channel-like chute means.

12. The header and conditioner unit combination set forth in claim 11 in which flange-like guard members are carried by the opposite sides of said conditioner unit adjacent the entrance thereof, and said combination further including angle-iron connecting members having one flange connected to said guard members and the side plate members on said conditioner unit being connected to the other flanges of said connecting members, and means on said connecting members also supporting said second plate of the top means of said chute for pivotal movement relative to said conditioner unit and first plate of said top means.

13. The header and conditioner unit combination according to claim 12 in which the bottom of said channel-like chute means comprises one plate carried by said conditioner unit and extending forwardly from the lower edge of the entrance of said unit, said plate being connected pivotally at the opposite sides thereof to said angle-iron connecting members.

14. Chute means connectable between the exit opening of a crop-consolidating header and entrance of a crop-conditioner unit each arranged to be generally independently and movably supported by the forward end of a tractor, said chute means comprising in combination: a first chute section having attaching means connectable to a header adjacent the exit opening and including side plates and a top plate arranged to extend rearwardly from said header, and a bottom plate having means at the normally forward edge thereof for pivotally connecting the same to said header and extend rearwardly therefrom; and a second chute section comprising transversely spaced connecting members attachable respectively to opposite sides of the entrance of said conditioner unit, side plates extending normally forwardly from said connecting members and overlapping the side plates of said first chute section, bottom and top plates pivotally supported by said connecting members and extending normally forwardly therefrom for overlapping engagement with said bottom and top plates of said first chute section and side plates connected to and extending perpendicularly from the opposite ends of said bottom and top plates of said second chute section and partially overlapping said side plates of said first and second chute sections to form therewith composite sides substantially completely closing the sides of said chute sections when the same are supported by a header and conditioner unit in operative relationship with each other.

15. The chute means according to claim 14 in which the top plate of said second chute section slidably overlies the top plate of said first chute section in operation and the bottom plate of said first chute section overlies the bottom plate of said second chute section in operation.

References Cited by the Examiner
UNITED STATES PATENTS

| | | |
|---|---|---|
| 2,529,180 | 11/1950 | Oehler. |
| 2,822,656 | 2/1958 | Rogers _____ 56—208 |
| 2,999,348 | 9/1961 | Cunningham _____ 56—192 X |

ABRAHAM G. STONE, *Primary Examiner.*

ANTONIO F. GUIDA, *Examiner.*